May 31, 1932.                J. H. SOLE                1,860,556
                              REGULATOR
                    Filed June 28, 1929      2 Sheets-Sheet 1

INVENTOR
J. H. SOLE
BY *Wayne B Wells*
ATTORNEY

May 31, 1932.        J. H. SOLE        1,860,556
REGULATOR
Filed June 28, 1929        2 Sheets-Sheet 2

INVENTOR
J. H. SOLE
BY Wayne B Wells
ATTORNEY

Patented May 31, 1932

1,860,556

UNITED STATES PATENT OFFICE

JOHN H. SOLE, OF BROOKLYN, NEW YORK, ASSIGNOR TO BELL TELEPHONE LABORATORIES, INCORPORATED, OF NEW YORK, N. Y., A CORPORATION OF NEW YORK

REGULATOR

Application filed June 28, 1929. Serial No. 374,601.

This invention relates to regulator systems and particularly to voltage regulator systems for power generators.

One object of the invention is to provide a supply circuit with a voltage regulator that shall change voltage variations into speed variations in an improved manner and control the voltage on the supply circuit according to the speed variations.

Another object of the invention is to provide a generator with a voltage regulator that shall have a motor with saturated field excitation for changing generator voltage variations into motor speed variations and control the generator excitation according to the motor speed to maintain the generator voltage constant.

A further object of the invention is to provide a generator with a voltage regulator that shall have a motor with saturated field excitation for changing generator voltage variations into motor speed variations and a centrifugal governor having a contact member vibrated at a rate depending on the motor speed for governing the excitation of the generator to maintain the generator voltage constant.

It is desirable and in many cases essential to maintain substantially constant the voltage of small generators which are employed for charging batteries and for supplying current to space discharge devices. Satisfactory operation of the batteries and the space discharge devices cannot be obtained if the source of current is subject to voltage variations. Generators for supplying current to space discharge devices are generally of small capacity so that it is impractical to employ many of the regulators now in commercial use.

The voltage regulator constructed in accordance with this invention is very simple in construction and operation and is particularly applicable for controlling the voltage of small generators. Moreover, the regulator not only gives satisfactory voltage control, but has a low maintenance cost.

Although the regulator is particularly adapted to govern the voltage of direct current generators it is equally applicable for controlling the voltage on supply circuits. In the preferred modification of the invention, a motor having saturated field excitation is connected across the generator terminals in order to be operated at a speed depending on the generator voltage. If so desired the motor may be provided with permanent magnets or may be provided with suitable constant excitation from a separate source of current. Provision may also be made for compensating the motor in accordance with the load on the generator.

The motor operates a centrifugal governor which carries a vibratory contact member adapted to engage a stationary contact member. The centrifugal governor is preferably mounted on the armature shaft so that the vibrating contact member and the stationary contact member may be aligned with the axis of the motor. The vibratory contact member is spring-supported and vibrates at a rate depending not only upon the resiliency of the spring support, but also upon the speed of rotation of the motor and the centrifugal governor. The vibratory contact member engages the stationary contact member at a rate depending upon the speed of the motor and moreover the length of the engagement of the contact members as compared with the length of break between the contact members varies in accordance with the motor speed. The contact members controlled by the centrifugal governor control a resistance element in the field circuit of the generator. When the contact members are in engagement with each other the resistance element in the generator field circuit is short circuited to increase the generator excitation and accordingly to increase the generator voltage. The field excitation of the generator is thus controlled according to the speed of the motor.

In the accompanying drawings Figure 1 is a diagrammatic view of a regulator system constructed in accordance with the invention.

Figure 1:
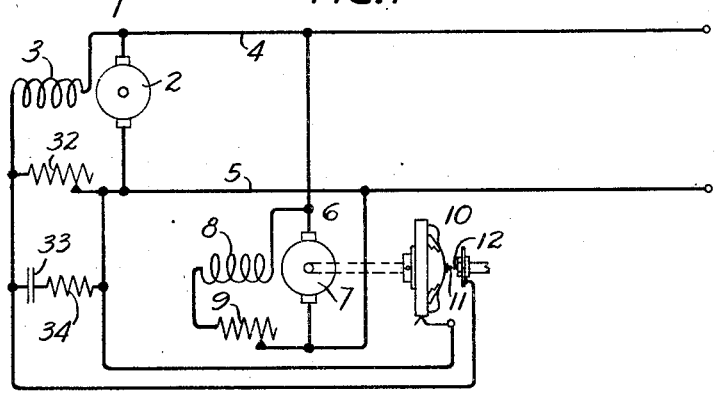

Referring to Fig. 1 of the drawings a generator 1 comprising an armature 2 and a field winding 3 is connected to two conductors 4 and 5. The conductors 4 and 5 may be connected to any load circuit or to batteries. A motor 6 comprising an armature 7 and a shunt field winding 8 is connected across the supply conductors 4 and 5 in order to be operated by the generator 1. The motor 7 is assumed to have saturated field excitation in order to operate at a speed depending upon the generator voltage. An adjustable resistance 9 is provided in the circuit of the field winding 8 to adjust the motor excitation. A centrifugal governor 10 is preferably mounted on the armature shaft of the motor 6 to be operated directly in accordance with the motor speed. A vibratory contact member 11, which is rotated with the motor 6, is adapted to intermittently engage a stationary contact member 12. The two contact members 11 and 12 are aligned with the axis of the motor armature 7.

Figure 6:
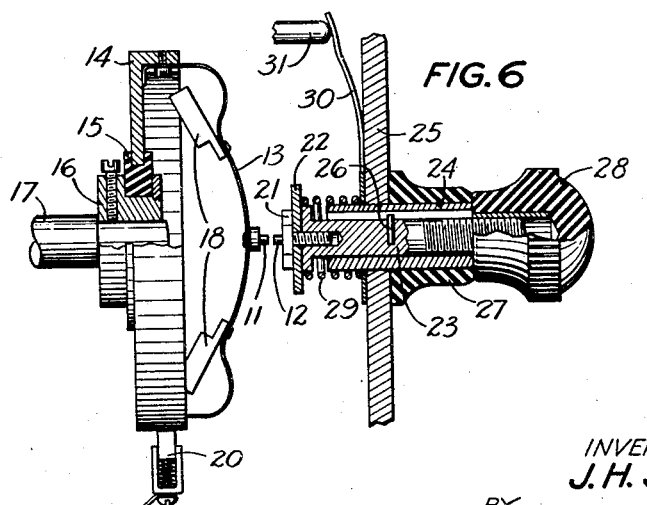
Fig. 6 is a sectional view of the centrifugal governor for controlling the generator excitation according to the motor speed.

Referring to Fig. 6 of the drawings the contact member 11 is shown mounted on a spring member 13 which is attached at its ends to a brass cup-shaped member 14. The cup-shaped member 14 is mounted on a ring of insulating material 15 which in turn is secured to a collar 16 preferably made of steel. The collar 16 is secured to the armature shaft 17 by a set screw. The spring member 13 carries two weight members 18 located on opposite sides of the contact member 11. The weight members 18, upon rotation of the governor, are operated by centrifugal force to exert a force tending to move the contact member 11 away from the stationary contact member 12. The contact member 11 is not only moved in accordance with the speed of rotation of the governor and the motor 6 but also vibrates constantly in accordance with the inherent vibration rate of the spring support 13. The cup-shaped member 14 serves as a slip ring for connecting a brush member 20 with the movable contact member 11.

The stationary contact member 12 is mounted on a bolt member 21 and secures a washer or disc member 22 to a shaft 23 which is preferably made of brass. The shaft 23 is mounted in a brass sleeve 24 which in turn is carried by an insulating support 25. A pin 26 projects from the shaft 23 into a slot in a brass sleeve in order to prevent rotation of the shaft with respect to the sleeve or the insulating support 25. A collar 27 is fixedly secured to the sleeve 24 and engages one side of the insulating support 25 as shown in Fig. 6 of the drawings. A thumb nut 28 is threadedly connected to the end of the shaft 23 in order to effect longitudinal movement of the shaft upon rotation of the nut. A spring member 29 is positioned between the disc 22 and the insulating support 25 for exerting a force tending to move the stationary contact member 12 into engagement with the vibratory member 11.

In a centrifugal governor constructed as above described it is apparent the stationary contact member 12 may be adjusted with respect to the vibratory contact member 11 by the thumb nut 28. Such adjustment may be made with high precision. Moreover, it should be noted that when adjusting the contact member 12 no movement thereof other than a longitudinal movement is effected. No rotatable movement of the stationary contact member 12 can at any time take place. The stationary contact member 12 is connected by a spring member 30 to a contact 31.

Referring to Fig. 1 of the drawings an adjustable resistance element 32 is controlled by the centrifugal governor contact members 11 and 12 for governing the excitation of the generator field winding 3. When the contact members 11 and 12 are in engagement with each other the resistance member 32 is excluded from the circuit of the field winding 3. The opening of these contact members, however, inserts the resistance member into the field winding to lower the field excitation. A condenser 33 and a resistance element 34 are connected across the resistance element 32 for preventing abrupt interference with the generator field current upon opening and closing of the shunt circuit by the centrifugal governor contact members.

In a system constructed as described in referring to Figs. 1 and 6 of the drawings, the motor 6 having saturated field excitation will be operated directly in accordance with the generator voltage. Consequently, generator voltage variations are transformed into speed variations by means of the motor. The motor operates the centrifugal governor 10 to control the resistance member 32 in accordance with the motor speed and accordingly in accordance with the generator voltage. As the speed of the motor increases by reason of increased voltage on the conductors 4 and 5 the vibratory contact member 11 will be drawn away from the stationary contact member 12 to insert the resistance element 32 in circuit with the generator field winding 3 to lower the generator voltage. In the operation of the centrifugal governor the spring member 13 is in constant vibration.

The change in position of the contact member 11 by reason of the variations in the motor speed will vary the time of engagement between the contact members 11 and 12 as compared with the time of disengagement of such members. The vibratory engagement between the contact members 11 and 12 governs the resistance element 32 for controlling the generator field to maintain substantially constant generator voltage.

Figure 2:
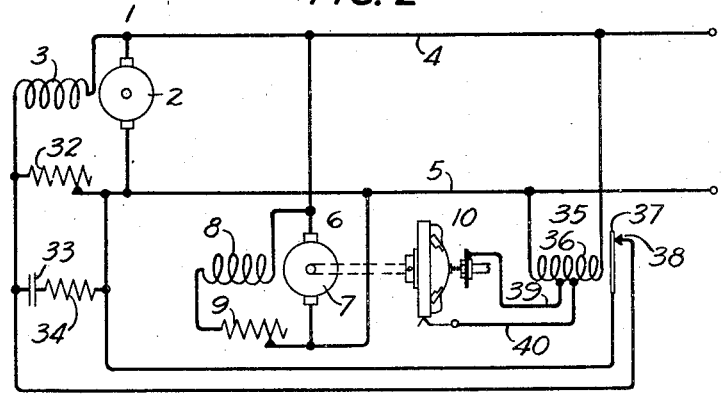
Fig. 2 is a diagrammatic view of a modified regulator system wherein the centrifugal governor controls a relay for governing the generator field excitation.

In referring to Figs. 2, 3, 4 and 5 of the drawings like parts will be referred to by similar reference characters. If the regulating current is not within the current carrying capacity of the centrifugal governor contacts 11 and 12, a relay as, for example, relay 35 shown in Fig. 2 of the drawings, may be provided between the centrifugal governor and the generator field circuit. The relay 35 comprises a winding 36 which is connected across the conductors 4 and 5 and armature 37 which is adapted to engage the contact 38 to short-circuit the resistance member 32 in the circuit of the generator field winding 3. The contact members 11 and 12 of the centrifugal governor 10 are connected to taps 39 and 40 extending from the relay winding 36 so that during engagement between the governor contact members 11 and 12, a portion of the relay winding is short-circuited for insuring the release of the armature 37 to short-circuit the resistance element 32. The general operation of the system shown in Fig. 2 is the same as the system shown in Fig. 1 of the drawings.

Figure 3:
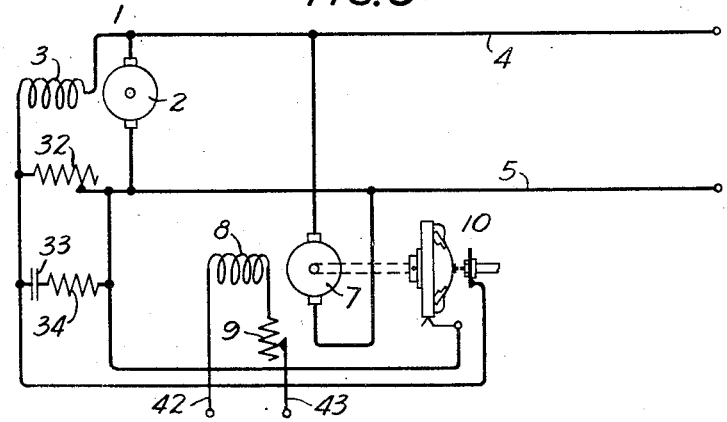
Fig. 3 is a diagrammatic view of a modified regulator system wherein the motor field is excited from an external source of current.

In Fig. 3 of the drawings a regulator system is shown which is the same as the system shown in Fig. 1 except that the motor field winding 8 in place of being shown connected in shunt to the motor armature 7 is connected by conductors 42 and 43 to a suitable constant voltage source.

Figure 4:
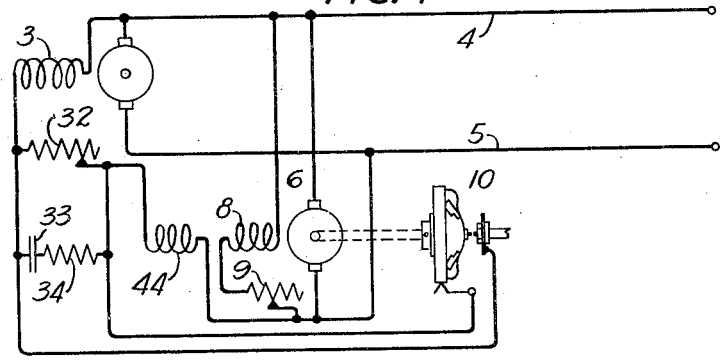
Fig. 4 is a diagrammatic view of a modified regulator system wherein the motor is provided with compensation excitation.

In the system shown in Fig. 4 of the drawings the motor 6 is provided with compensation excitation according to the load on the generator. A compensating winding 44 is connected in the generator field circuit to oppose the motor field winding 8. Thus the compensating winding 44 is energized according to the energization of the generator field winding 3 and compensates the motor excitation according to the generator excitation. If an increased load is placed upon the generator and the voltage thereof is lowered the motor 6 operates the centrifugal governor 10 to increase the generator excitation. The increased generator excitation increases the excitation of the compensating winding 44 and lowers the excitation of the motor field winding 8 which normally supplies the motor with saturated field excitation. The lowering of the motor excitation slightly increases the motor speed slightly to compensate for the increased load of the generator.

Figure 5:
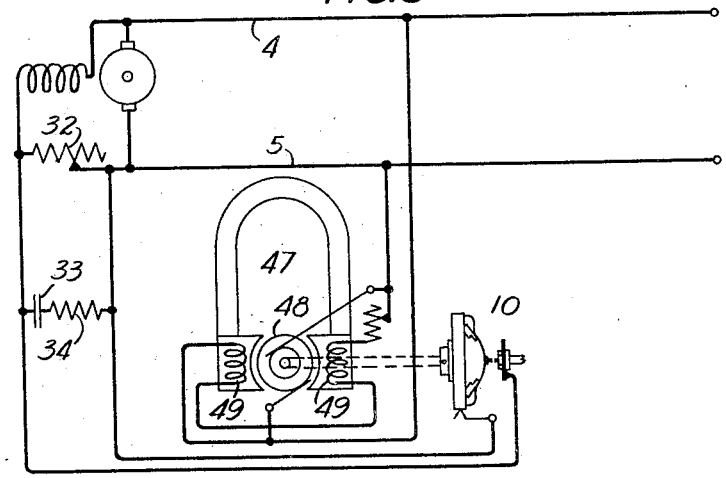
Fig. 5 is a diagrammatic view of a regulator system wherein the motor is provided with fields having permanent magnet cores.

Referring to the system shown in Fig. 5 of the drawings the centrifugal governor 10 is operated by a motor 47 having fields produced by the permanent magnets. The armature 48 of the motor 47 is connected across the conductors 4 and 5 in the same manner as the motor 6 shown in Fig. 1. Preferably the permanent magnets are assisted by field coils 49 connected across the supply conductors 4 and 5.

In the systems above described it is essential to have the motor operate at a speed directly in accordance with the generator voltage. In order to have the motor operate in accordance with the generator voltage it is essential to have the field excitation of the motor unaffected by the generator voltage variations. This is accomplished by saturating the motor field or by connecting the motor fields to an external source of current. The same effect is also accomplished as shown in Fig. 5 by providing permanent magnets for exciting the motor. In the operation of the invention, generator voltage variations are first transformed into motor speed variations. The motor speed variations control a centrifugal governor for governing the generator field excitations and thus control the generator voltage.

Modifications of the invention and in the arrangement and location of parts may be made within the spirit and scope of the invention and such modifications are intended to be covered by the appended claims.

What is claimed is:

1. In a regulator system, a generator having a regulating field winding, a motor having constant field excitation connected across the terminals of said generator to be operated at a speed depending solely on the generator voltage, a centrifugal governor directly operated by said motor, said governor comprising a vibrating rotating contact member and a stationary contact member both aligned with the axis of rotation of the governor, the rotating contact member being mounted on a spring member having the ends thereof fixedly secured to the governor at points symmetrical with respect to the axis of rotation of the governor, weight members secured to the spring member at opposite sides of the axis of rotation of the governor, the rate of vibration and the periods of engagement between the contact members depending on the angular speed of operation of the governor, and means comprising a resistance element in the field winding circuit controlled directly by said contact members for governing said field winding to maintain the generator voltage constant.

2. In a regulator system, a generator having a regulating field winding, a motor connected across the terminals of said generator, said motor having saturated field excitation to operate at a speed depending solely on the generator voltage, a centrifugal governor directly operated by the motor according to the angular speed thereof, said governor comprising two contact members aligned with the axis of rotation of the governor, one of said contact members being stationary and the other cooperating contact member being mounted on a spring member carried by and rotating with the governor, said spring member having the ends thereof fixedly secured to the governor at points symmetrical with respect to the axis of rotation of the governor and carrying two weight members subject to centrifugal force for changing the position of the spring member and the rotating contact member, and a resistance element in the circuit of said regulating field winding and controlled directly by the movement of said rotating contact member to maintain the generator voltage constant.

3. In a regulator system, a generator having a regulating field winding, a motor connected across the generator terminals and having constant field excitation to be operated at a speed depending solely on the generator voltage, a centrifugal governor directly operated by said motor and comprising a stationary and a rotating contact member aligned with the axis of rotation of the governor and a rotating spring member having the ends thereof fixedly secured to the governor at equal distances from the axis of rotation of the governor for supporting the rotating contact member, said governor operating the contact members to effect engagement at a rate depending on motor angular speed and to vary the relative lengths of make and break periods according to the motor speed, and means comprising a resistance element in the field winding circuit controlled directly by the governor contact members for varying the excitation of said field winding to maintain the motor speed constant.

4. In a regulator system, a direct current generator having a regulating field winding, a shunt wound motor connected to said generator, said motor having saturated field excitation to operate at a speed depending solely on the generator voltage, means comprising a differential field winding for compensating said motor according to the generator load, a centrifugal governor operated by said motor, said governor having a contact member vibrating at a speed depending on the motor angular speed and a second contact engaged by the vibratory contact member, said contact members being aligned with the axis of rotation of the governor, and means comprising a resistance element in the field winding circuit governed directly by said contact members for controlling said regulating field winding to maintain the generator voltage constant.

5. A voltage regulator comprising a motor having a centrifugal governor directly connected to the armature shaft thereof, said governor comprising a rotating contact member cooperating with a stationary contact member, said contact members being aligned with the axis of rotation of the governor, a spring member having the ends thereof secured to the governor at equal distances from the axis of rotation of the governor and carrying said rotating contact member, and weights secured to the spring member and operated by centrifugal force upon rotation of the motor for controlling the movement of the spring member and the engagement of the contact members.

6. A regulator comprising a motor having a centrifugal governor directly connected to the armature shaft thereof, said governor comprising two cooperating contact members aligned with the axis of rotation of the governor, one of said contact members being held stationary and the other contact member rotating with the governor and movable along the axis of rotation of the governor to engage and disengage the stationary contact member according to the operation of the motor, and a spring member having the ends thereof fixedly secured to the governor at points symmetrically located with respect to the axis of rotation of the governor for supporting the rotating contact member.

In witness whereof, I hereunto subscribe my name this 21st day of June, 1929.

JOHN H. SOLE.